(12) United States Patent
Schmidt

(10) Patent No.: US 10,539,167 B2
(45) Date of Patent: Jan. 21, 2020

(54) METHOD FOR ATTACHING A JOINT ELEMENT IN A METAL SHEET AND JOINT ELEMENT

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 111 days.

(21) Appl. No.: 14/759,037

(22) PCT Filed: Mar. 3, 2014

(86) PCT No.: PCT/DE2014/100072
§ 371 (c)(1),
(2) Date: Jul. 2, 2015

(87) PCT Pub. No.: WO2014/166478
PCT Pub. Date: Oct. 16, 2014

(65) Prior Publication Data
US 2016/0017904 A1    Jan. 21, 2016

(30) Foreign Application Priority Data

Apr. 10, 2013 (DE) .................. 10 2013 103 609
Apr. 25, 2013 (DE) .................. 10 2013 104 224

(51) Int. Cl.
*F16B 5/02* (2006.01)
*F16B 37/06* (2006.01)
(Continued)

(52) U.S. Cl.
CPC .............. *F16B 5/02* (2013.01); *B23P 19/062* (2013.01); *F16B 13/00* (2013.01); *F16B 37/065* (2013.01); *F16B 37/068* (2013.01)

(58) Field of Classification Search
CPC .......... F16B 37/068; B21J 15/00; B21J 15/02; B21J 15/04; B29C 65/56; B29C 65/567;
(Continued)

(56) References Cited

U.S. PATENT DOCUMENTS 2,170,472 A    8/1939  Fitch
3,775,791 A *  12/1973 Grube ................... B21D 53/24
                                                411/179
(Continued)

FOREIGN PATENT DOCUMENTS

DE         19808628      9/1999
DE       102004030223    1/2006
(Continued)

OTHER PUBLICATIONS

International Search Report, PCT/DE2014/100072, dated Jul. 2, 2014.

*Primary Examiner* — Sarang Afzali
*Assistant Examiner* — Darrell C Ford
(74) *Attorney, Agent, or Firm* — Welsh Flaxman & Gitler LLC

(57) ABSTRACT

The invention relates to a method for anchoring a joint element (1) in a metal sheet (7) so as to be secured against rotation, the hardness of the metal sheet being equal to or greater than the hardness of the material of the joint element. A locking and securing portion (4), which protrudes away from a head (2) of the joint element, is inserted into a joint opening (8), which is provided in the metal sheet and which has a cross section that deviates from the circular shape, such that an edge of the joint opening forms at least one region with a maximum distance to a central axis of the joint opening and at least one region with a minimum radial distance to the central axis of the joint opening, and the head of the joint element rests against the metal sheet after being anchored.

13 Claims, 3 Drawing Sheets

(51) Int. Cl.
  *B23P 19/06* (2006.01)
  *F16B 13/00* (2006.01)

(58) Field of Classification Search
  CPC ......... Y10T 29/49947; Y10T 29/49954; Y10T 29/49956; Y10T 29/5118
  USPC ..... 411/180, 181, 183, 187, 188; 29/525.01, 29/525.05, 525.06, 34 B
  See application file for complete search history.

(56) References Cited

U.S. PATENT DOCUMENTS

| | | | | |
|---|---|---|---|---|
| 3,828,517 | A * | 8/1974 | Johnson | B21D 39/032 29/505 |
| 4,048,708 | A * | 9/1977 | Briles | B21J 15/02 29/509 |
| 4,048,898 | A * | 9/1977 | Salter | F16B 5/02 29/446 |
| 4,186,787 | A * | 2/1980 | Husain | F16B 37/044 411/183 |
| 4,208,944 | A * | 6/1980 | Moryl | F16B 37/043 411/182 |
| 4,388,031 | A * | 6/1983 | Rodgers | F16B 19/086 411/344 |
| 4,557,651 | A * | 12/1985 | Peterson | B21D 39/03 29/524.1 |
| 4,642,869 | A * | 2/1987 | Muller | B23P 19/062 219/100 |
| 4,830,557 | A * | 5/1989 | Harris | F16B 37/044 411/112 |
| 5,129,771 | A * | 7/1992 | Briles | B21J 15/02 29/524.1 |
| 5,259,713 | A * | 11/1993 | Renner | B25B 27/0007 411/183 |
| 5,365,654 | A * | 11/1994 | Moulton | F16B 19/04 257/E23.086 |
| 5,403,135 | A * | 4/1995 | Renner | B25B 27/0007 29/525.06 |
| 7,351,022 | B2 * | 4/2008 | Denslow | F16B 5/04 411/501 |
| 9,808,855 | B2 * | 11/2017 | Chung | B21J 15/02 |
| 10,197,079 | B2 * | 2/2019 | Babej | B21D 28/26 |
| 2002/0172573 | A1 * | 11/2002 | Pamer | F16B 37/068 411/337 |
| 2004/0240961 | A1 * | 12/2004 | Bentrim | F16B 37/065 411/180 |
| 2007/0084038 | A1 * | 4/2007 | Cochet | B21J 15/02 29/524.1 |
| 2007/0224017 | A1 * | 9/2007 | Pamer | B21K 1/702 411/162 |
| 2008/0289143 | A1 * | 11/2008 | Lu | F16B 37/061 16/2.4 |
| 2009/0297291 | A1 * | 12/2009 | Schmidt | B23P 19/062 411/180 |
| 2011/0211932 | A1 * | 9/2011 | Babej | F16B 39/282 411/188 |
| 2013/0209196 | A1 * | 8/2013 | Brewer | F16B 19/1045 411/500 |
| 2014/0079505 | A1 * | 3/2014 | Tsai | F16B 37/065 411/34 |
| 2014/0130333 | A1 * | 5/2014 | Jonsson | A61F 5/01 29/525.01 |
| 2015/0369274 | A1 * | 12/2015 | Stojkovic | B23P 19/04 411/181 |
| 2016/0123362 | A1 * | 5/2016 | Iwase | B23K 11/00 411/82 |
| 2017/0304969 | A1 * | 10/2017 | Hoshino | F16B 37/068 |
| 2017/0314605 | A1 * | 11/2017 | Splitt | F16B 37/068 |
| 2018/0100528 | A1 * | 4/2018 | Ellis | B21J 15/06 |
| 2018/0313391 | A1 * | 11/2018 | Diehl | F16B 39/02 |
| 2018/0333770 | A1 * | 11/2018 | Kuo | B21J 15/42 |
| 2019/0070656 | A1 * | 3/2019 | Watanabe | B21D 39/20 |
| 2019/0338798 | A1 * | 11/2019 | Glueck | F16B 17/008 |

FOREIGN PATENT DOCUMENTS

| | | |
|---|---|---|
| DE | 102008016273 | 6/2009 |
| DE | 202004021831 | 5/2011 |
| DE | 102013104224.4 | 10/2014 |

* cited by examiner

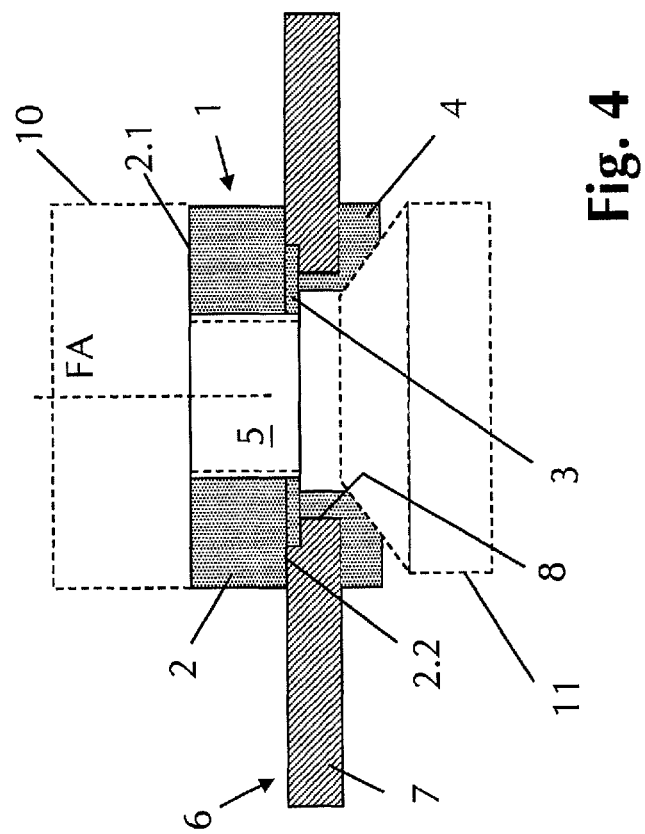
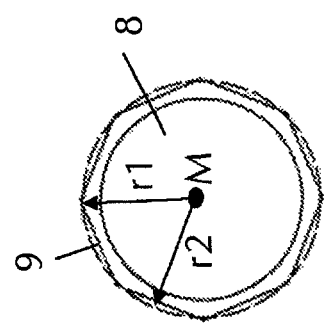

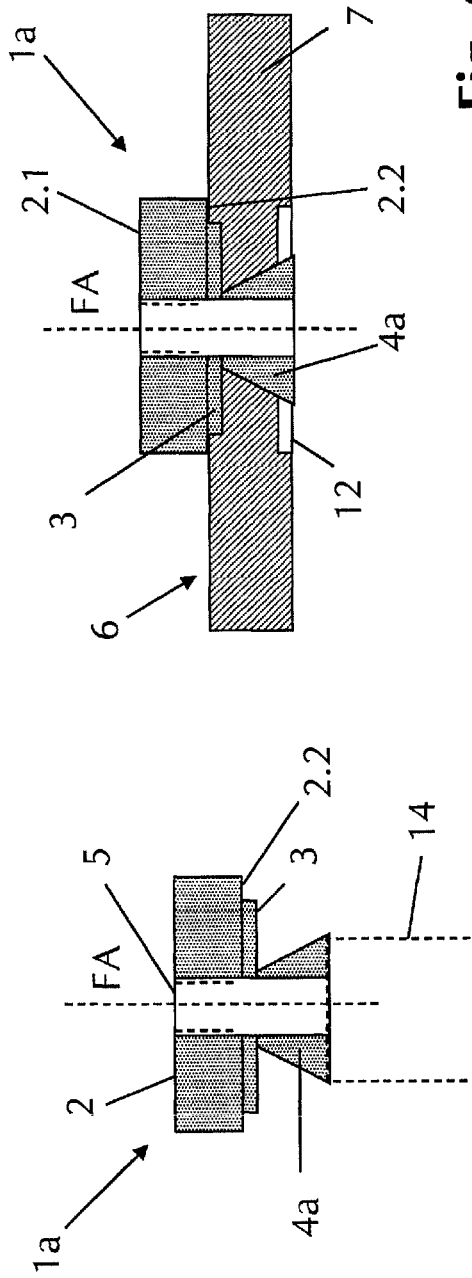
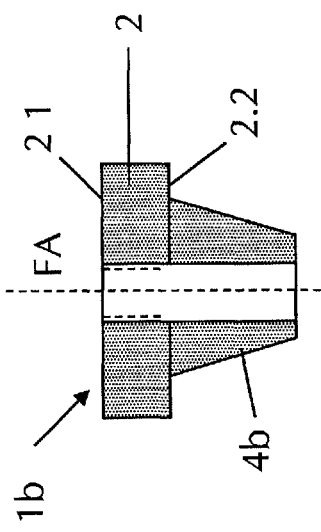
Fig. 6
Fig. 7
Fig. 5

METHOD FOR ATTACHING A JOINT ELEMENT IN A METAL SHEET AND JOINT ELEMENT

BACKGROUND OF THE INVENTION

The invention relates to a method for anchoring a joint element in a metal sheet so as to be secured against rotation by inserting a joining and securing section protruding from the head of the joint element into a joint opening provided in the metal sheet. The joint element has a cross section deviating from the circular shape, so that an edge of the joint opening forms at least one region with a maximum distance (r1) to a middle axis (M) of the joint opening and at least one region with a minimum radial distance (r2) to the middle axis (M) of the joint opening. The joint element, with its head, rests against the metal sheet after being anchored.

Methods for attaching joint elements in metal sheets are known in varying embodiments.

It is an object of the invention to provide a method that makes it possible to attach joint elements in metal sheets with a high level of twist protection or torque absorption, respectively, at a reduced outlay.

An essential aspect of the method according to the invention lies in the fact that the joining and locking section forms a locking section in an area adjoining the head, and that half the diameter of the locking section is equal to or approximately equal to the maximum radial distance, but larger than the minimum radial distance, and that the locking section is deformed into a cross sectional shape deviating from the rotationally symmetrical shape while joining and fixing the joint element.

It is further advantageous that the hardness of the metal sheet is equal to or approximately equal to or essentially equal to or even larger than the hardness of the joint element material.

SUMMARY OF THE INVENTION

In an embodiment, the locking section is designed with a peripheral surface rotationally symmetrical relative to a joint element axis, wherein the locking section is preferably deformed into a cross sectional shape corresponding to the cross sectional shape of the joint opening. The locking section advantageously is located at least in the region of those surface sides of the metal sheet against which the head of the joint element rests that is deformed by the cross sectional shape deviating from the rotationally symmetrical shape.

In a preferred embodiment, the locking section is formed by an annular section at the transition between the head and the joining and securing section.

The locking section is advantageously formed by at least one axial partial length of the joining and securing section, preferably of the joining and securing section that tapers toward its free end.

A joining and securing section designed as a rivet collar can also be deformed into a deformed rivet collar in such a way that the metal sheet in the area of the edge of the joint opening is clamped between the deformed rivet collar and the head of the joint element. The free end of the joining and securing section advantageously exhibits a cross section that is larger than a cross section in a partial area between the locking section and this free end, and locking of the joint element on the metal sheet is achieved by pressing or permanently deforming the metal sheet into the undercut on the side facing away from the head.

In another advantageous embodiment, the metal sheet is deformed while fixing the joint element in order to form a dome-shaped section in such a way that the end of the joining and securing section or of the deformed rivet collar lying remote from the head of the joint element is accommodated in a recess of the dome-shaped section.

The joint element is preferably a connecting element in the form of a nut or bolt.

The subject matter of the invention also relates to a joint element for use in the method according to the invention with a head, and with a joining and securing section protruding from a front or bottom side of the head, in which at least a partial length of the joining and securing section that adjoins the head is designed with a locking section, half the diameter of which is equal to or essentially equal to the maximum radial distance exhibited by the edge of a joint opening from the middle axis of this joint opening, but larger than the minimum radial distance exhibited by the edge of the joint opening from the middle axis of the joint opening.

As used in the invention, the term "essentially" or "approximately" refers to deviations from the respective exact value by +/−10%, preferably by +/−5%, and/or deviations in shape from changes that are insignificant with respect to function.

Further developments, advantages and possible applications of the invention may also be gleaned from the following description of exemplary embodiments, and from the figures. All described and/or graphically illustrated features are basically the subject of the invention, whether taken separately or in any combination, regardless of how they are summarized in the claims or back references thereto.

BRIEF DESCRIPTION OF THE DRAWINGS

The invention will be explained in more detail below based on the figures using exemplary embodiments.

FIG. 3 displays a joint opening provided in a component made out of a metal sheet.

FIG. 4 displays a schematic view the component with the joint element from FIG. 1 and FIG. 2 attached to this component.

FIG. 5 displays a view as in FIG. 1 a joint element according to another embodiment of the invention.

FIG. 6 displays a view as in FIG. 4 with the joint element from FIG. 5 attached in the component.

FIG. 7 displays a view as in FIG. 1 of an alternate embodiment of the joint element according to the invention.

DETAILED DESCRIPTION OF THE INVENTION

Figure 2:
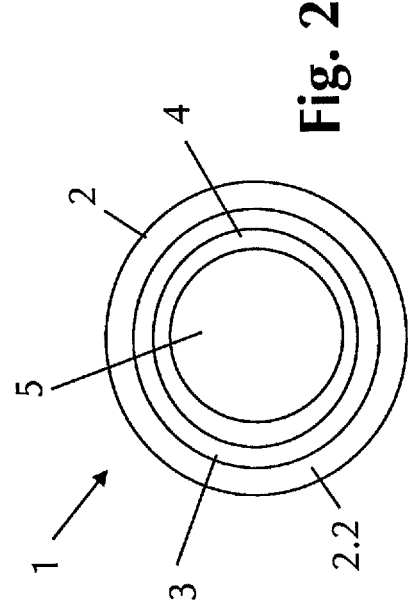
FIG. 2 displays a simplified version a top view of the bottom side of the joint element of FIG. 1 exhibiting a rivet collar.

FIGS. 1-4 show a joint element 1 designed as a rivet nut comprised of a metal material, preferably of steel. The joint element 1 is designed with a head or joint element body 2, which is circular cylindrical on its periphery, for example, and exhibits an upper side 2.1 and a lower side 2.2. The joint element body 2 is provided on the lower side 2.2 with a locking section 3, which in the embodiment depicted exhibits its a peripheral surface that adjoins a joint element axis FA in a circularly cylindrical manner, and has an axial thickness in the direction of the joint element axis FA that is smaller than the corresponding axial thickness of the joint element body 2. The outer diameter of the locking section 3 is smaller than the outer diameter of the joint element body 2. A joining and securing section adjoins the locking section 3 in the form of a rivet collar 4, which is designed as a hollow cylinder or sleeve that concentrically envelops the joint element axis FA, and exhibits an outer diameter that is smaller than the outer diameter of the locking section 3. A threaded hole 5 coaxial to the joint element axis FA is provided in the joint element body 2.

In order to attach the joint element 1 in a component 6 or in the metal sheet 7 making up this component, this metal sheet has incorporated into it a joint opening 8 that exhibits a cross sectional shape deviating from the cross sectional shape of the locking section 3, i.e., a cross sectional shape deviating from the circular shape. In the embodiment shown, the joint opening 8 is polygonal in design, and has an octagonal cross section. The dimensions of the joint openings 8 are selected in such a way that the maximum radial distance r1 of the edge 9 to the middle axis M of the joint opening 8 or from the axis FA is equal to or approximately equal to half the diameter of the locking section 3, while the minimum radial distance r2 of the edge 9 to the middle axis M is smaller than half the diameter of the locking section 3. The maximum and minimum radial distances r1 and r2 alternate in the peripheral direction of the joint opening 8. The maximum distance r1 lies in the corner areas of the joint opening 8, and the minimum radial distance r2 lies between two corner areas of the joint opening 8.

The material of the metal sheet 7 preferably has a hardness equal to or essentially equal to, but preferably larger than the hardness of the material of the joint element 1. However, the hardness of the metal sheet 7 can also be approximately equal to the hardness of the material of the joint element 7, i.e., up to 20% less than the hardness of the material of the joint element 7, for example. After inserting the joint element 1 with the rivet collar 4 into the joint opening 8 in a way that the lower side 2.2 of the head 2 rests against what on FIG. 4 is the upper surface side of the metal sheet 7, a tool exhibiting the two tool parts 10 and 11 is used to press and fix the joint element 1 by riveting or forming the rivet collar 4 so as to clamp the metal sheet 7 between the head and formed rivet collar 4 in the area of the edge of the joint opening 8. In this riveting process, the locking section 3 is simultaneously deformed in such a way as to assume the shape of the edge 9 of the joint opening 8, i.e., it also has the cross section deviating from the circular shape after deformed. The excess material of the original locking section 3 is thereby collected in the joint opening 8 via permanent deformation, axially in relation to the axis FA. In the depicted embodiment, the axial thickness of the locking section is smaller than the thickness of the metal sheet 7. The axial length of the non-deformed rivet collar 4 is larger than the thickness of the metal sheet 7.

FIGS. 5 and 6 present an additional embodiment of a joint element 1a, which in place of the rivet collar 4 exhibits a joining and securing section 4a, the outer surface of which is in turn rotationally symmetrical in design relative to the axis FA, but whose outer diameter expands like truncated cone toward the end facing away from the head 2. The axial length of the joining and securing section 4a is shorter than the corresponding axial length of the rivet collar 4, and corresponds to the thickness of the metal sheet 7, for example. After inserting the joint element 1a into the joint opening 8 in such a way that the lower side 2.2 of the head 2 rests against what on FIG. 6 is the upper surface side of the metal sheet 7, the latter is permanently deformed in the area of its lower side at the edge of the joint opening 8 at 12 so that the material of the metal sheet 7 positively engages the joining section 4a from behind.

The joint element 1a in turn has adjoining the head 2 the locking section 3, which is deformed into the cross sectional shape of the joint opening 8 deviating from the circular shape in the same way as described above for the joint element 1 while joining and fixing the joint element 1a, thereby yielding a high rotating protection or torque absorption for the joint element 1a anchored in the component 6.

Another embodiment depicted in FIG. 7 presents a joint element 1b with a joining and securing section 4b designed as a rivet collar, which is designed rotationally symmetrical relative to the axis FA on its peripheral surface, but exhibits a slightly conical taper toward the free end lying remote from the head 2. At least in proximity to the head 2, the joining and securing section 4b exhibits an area having a radius that is equal to or approximately equal to the larger radial distance r1, but is larger than the smaller radial distance r2 of the joint opening 8. When inserting and deforming the joining and securing section 4b into the deformed rivet collar, this aforementioned area of the joining and securing section 4b is in turn deformed in such a way as to exhibit the cross sectional shape of the joint opening 8 that deviates from the circular shape, thereby ensuring the high torque protection of the joint element 1b attached in the component 6.

All embodiments share in common that the periphery of the respective joint element 1, 1a, 1b is designed rotationally symmetrical relative to the axis FA on the locking section 3 or on the area of the joining and securing section 4, 4a and 4b that forms this locking section, so that attention need not be paid to a prescribed orientation or turning position of the joint element while inserting the joining and securing section 4, 4a and 4b into the joint opening, i.e., the joint element can be inserted into the joint opening 8 in any turning or angular position, which makes it significantly easier to attach the joint element 1, 1a, 1b on the component 6. All embodiments of the invention further share in common that, when joining and securing or pressing and riveting the joint element 1, 1a, 1b, rotating protection is afforded to the surface side of the metal plate 7 against which the head 2 of the joint element 1, 1a, 1b also rests, specifically by deforming the locking section 3 of the partial area of the forming and securing section 4b that forms this locking section.

The invention was described above based upon exemplary embodiments. It goes without saying that numerous modifications are possible. For example, it was assumed above that the joint opening 8 exhibits an octagonal cross section. Of course, other cross sections deviating from the circular shape are also possible, for example polygonal cross sections of any kind, oval or rectangular cross sections, joint openings with a corrugated edge, on which depressions alternate with projections, as well as combinations of such cross sections.

It is further possible for the respective metal sheet to become deformed in a dome-like manner when fixing the joint element in place, causing the head 2 of the joint element 1, 1a, 1b to ultimately be located on the convex exterior of a dome-like section of the metal sheet 7, and the joining and securing section 4, 4a and 4b deformed into a deformed rivet collar or pressed into the metal sheet to be located on the concave side of the metal sheet 7 deformed in a dome-like manner inside a recess therein, so that the joining and securing section 4, 4a and 4b does not protrude over the surface side of the metal sheet 7 facing away from the head 2.

Figure 1:
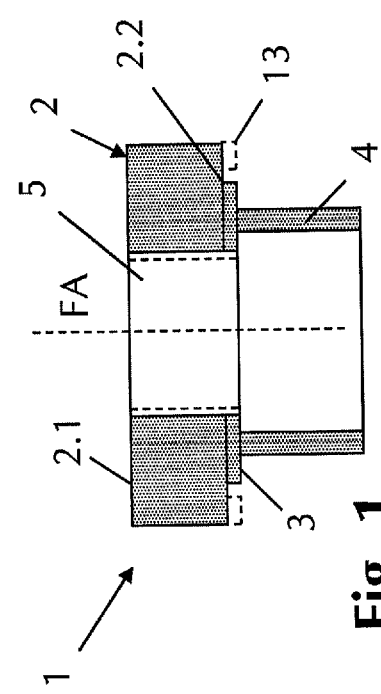
FIG. 1 displays a simplified and sectional view a joint element according to the invention in the form of a rivet nut.

In addition to the locking section 3 on the lower front side 2.2 in relation to axis FA, it is possible to provide several projections that are offset radially outward relative to the locking section 3 and spaced apart from the latter, or a ring enveloping the locking section 3 with a radial distance, as denoted with 13 on FIG. 1.

It was further assumed above that the joint element 1, 1a or 1b is a nut. Of course, the joint element can also exhibit another shape or be designed as a connecting element of another kind, for example as a bolt with a bolt shank, as denoted with the dashed line 14 on FIG. 5.

REFERENCE LIST 1, 1a, 1b Joint element
2 Head
2.1, 2.2 Front side
3 Locking section
4, 4a, 4b Joining and securing section
5 Threaded hole
6 Component
7 Metal sheet
8 Joint opening
9 Edge of joint opening
10, 11 Tool part
12 Deformed material section of metal sheet 7
13 Ring
14 Bolt shank
FA Joint element axis
M Middle axis of joint opening
r1, r2 Radial distance

The invention claimed is:

1. A method for anchoring a joint element in a metal sheet so as to be secured against rotation by inserting a joining and securing section protruding from a head of the joint element into a non-circular shaped joint opening provided in the metal sheet which exhibits a cross section deviating from a circular shape, so that an edge of the non-circular shaped joint opening forms at least one region with a maximum radial distance (r1) to a middle axis (M) of the non-circular shaped joint opening and at least one region with a minimum radial distance (r2) to the middle axis (NI) of the non-circular shaped joint opening, wherein the joint element, comprised of a metal material and a joint element body with a threaded hole coaxial to a joint element axis, with the head resting against the metal sheet after being anchored, and wherein the joint element comprises a locking section in an area adjoining the head, and a joining and securing section in the form of a rivet collar adjoining the locking section, the locking section having a circular cross sectional shape, and wherein half a diameter of the locking section is equal to or approximately equal to the maximum radial distance (r1), but larger than the minimum radial distance (r2), the method comprising the step of:
deforming the locking section into a cross sectional shape deviating from the circular cross sectional shape via permanent deformation while joining and affixing the joint element by riveting the rivet collar so as to clamp the metal sheet between the head and the formed rivet collar in an area of an edge of the joint opening, thereby yielding high rotating protection for the joint element anchored in the metal sheet and thereby ensuring a high torque protection of the joint element attached to the metal sheet, wherein the locking section is formed by an annular section at a transition between the head and the joining and securing section, the locking section has an outer diameter smaller than an outer diameter of the head but larger than an outer diameter of the joining and securing section and wherein a hardness of the metal sheet is greater than a hardness of a material of the joint element.

2. The method according to claim 1, wherein the locking section has a peripheral surface rotationally symmetrical relative to the joint element axis.

3. The method according to claim 1, wherein the locking section is deformed into a cross sectional shape corresponding to the cross sectional shape of the non-circular shaped joint opening.

4. The method according to claim 1, wherein the locking section is deformed into a cross sectional shape deviating from the rotationally symmetrical shape at least in surface sides of the metal sheet against which the head of the joint element rests.

5. The method according to claim 1, wherein the locking section is formed by at least one axial partial length of the joining and securing section that tapers toward a free end.

6. The method according to claim 1, wherein the joining and securing section in the form of the rivet collar is deformed into a deformed rivet collar such that the metal sheet in a region of an edge of the non-circular shaped joint opening is clamped between the deformed rivet collar and the head of the joint element.

7. The method according to claim 6, wherein the metal sheet is deformed while fixing the joint element in order to form a dome-shaped section in such a way that an end of the joining and securing section or of the deformed rivet collar lying remote from the head of the joint element is accommodated in a recess of the dome-shaped section.

8. The method according to claim 1, wherein a free end of the joining and securing section exhibits a cross section that is larger than a cross section in a partial area between the locking section and the free end, and in that locking of the joint element on the metal sheet is achieved by pressing or permanently deforming the metal sheet into an undercut on a side facing away from the head.

9. The method according to claim 1, wherein the joint element is a connecting element in the form of a nut or bolt.

10. A method for anchoring a joint element in a metal sheet so as to be secured against rotation by inserting a joining and securing section protruding from a head of the joint element into a non-circular shaped joint opening provided in the metal sheet which exhibits a cross section deviating from a circular shape, so that an edge of the non-circular shaped joint opening forms at least one region with a maximum radial distance (r1) to a middle axis (M) of the non-circular shaped joint opening and at least one region with a minimum radial distance (r2) to the middle axis (M) of the non-circular shaped joint opening, wherein the joint element, comprised of a metal material and a joint element body with a threaded hole coaxial to a joint element axis, with the head resting against the metal sheet after being anchored, and wherein the joint element comprises a locking section in an area adjoining the head, and a joining and securing section in the form of a rivet collar adjoining the locking section, the locking section having a circular cross sectional shape, and wherein half a diameter of the locking section is equal to or approximately equal to the maximum radial distance (r1), but larger than the minimum radial distance (r2), the method comprising the step of:
deforming the locking section into a cross sectional shape deviating from the circular cross sectional shape via permanent deformation while joining and affixing the joint element by riveting the rivet collar so as to clamp the metal sheet between the head and the formed rivet collar in an area of an edge of the joint opening thereby yielding high rotating protection for the joint element anchored in the metal sheet and thereby ensuring a high torque protection of the joint element attached to the metal sheet, wherein a joint assembly is produced, the joint assembly comprising the joint element anchored in the non-circular shaped joint opening of the metal sheet so as to be secured against rotation, wherein the joint element comprises the head with a joining and the locking section protruding from a front or a bottom side of the head, wherein at least a partial length of the joining and the locking section that adjoins the head has the locking section, half the diameter of which is equal to or essentially equal to the maximum radial distance (r1) exhibited by the edge of the non-circular shaped joint opening to the middle axis of the non-circular shaped joint opening but larger than the minimum radial distance (r2) exhibited by the edge of the non-circular shaped joint opening to the middle axis (M) of the non-circular shaped joint opening, wherein the locking section is formed by an annular section at a transition between the head and the joining and securing section, the locking section has an outer diameter smaller than an outer diameter of the head but larger than an outer diameter of the joining and securing section and wherein a hardness of the metal sheet is greater than a hardness of a material of the joint element.

11. The method for anchoring the joint element according to claim 10, wherein a peripheral surface of the locking section is rotationally symmetrical relative to a joint element axis (FA) and the locking section has an annular design with at least one of a circularly cylindrical peripheral surface or a conical peripheral surface.

12. The method for anchoring the joint element according to claim 11, wherein an axial dimension of the locking section in relation to the joint element axis (FA) is at most equal to or less than a thickness of the metal sheet.

13. The method for anchoring the joint element according to claim 10, wherein the joining and securing section is a rivet collar or a section that forms an undercut.

\* \* \* \* \*